March 11, 1941.                W. T. LANG                2,234,181
SPEED CONTROLLING DEVICE
Filed June 19, 1940
Fig-1-
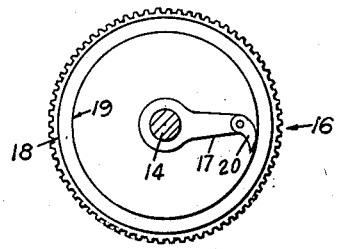
Fig-2-
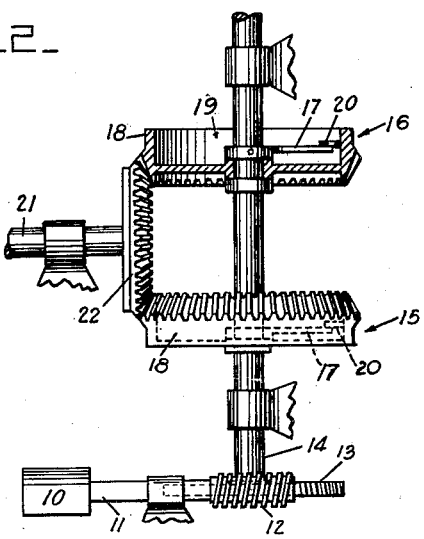
INVENTOR
Walter T. Lang
BY *G. J. Kessenich & J. H. Church*
ATTORNEY Patented Mar. 11, 1941

2,234,181

UNITED STATES PATENT OFFICE 2,234,181

SPEED CONTROLLING DEVICE

Walter T. Lang, Metuchen, N. J.

Application June 19, 1940, Serial No. 341,303

3 Claims. (Cl. 188—180)

(Granted under the act of March 3, 1883, as amended April 30, 1928; 370 O. G. 757)

This invention relates to a device for limiting the maximum clockwise or counterclockwise rotation of a shaft adapted to be rotated at variable speeds to the same speed or predetermined proportional part of the speed at which another shaft is driven.

It is an object of the invention to provide a simple and accurate device adapted for use in computing mechanisms for limiting the rotation of a shaft designed to be rotated in proportion to a given quantity to a specific limit which is governed by the rate of rotation of another shaft.

A further object of the invention is to provide a speed controlling device particularly adapted for limiting the angular or linear rate of a shaft in a fire control director to a speed of rotation not to exceed a given limit, as for example, the constant speed at which the disk is driven in a disk-and-roller type of rate mechanism or some predetermined proportional part of the disk speed.

The specific nature of the invention as well as other objects and advantages thereof will clearly appear from a description of a preferred embodiment as shown in the accompanying drawing in which:

Fig. 1 is a plan view of the device;

Fig. 2 is an elevational view partially in section showing the invention.

Referring now to the drawing by characters of reference there is shown a constant speed motor 10 of any desirable conventional design disposed in driving relation with a shaft 11 having a worm 12 affixed thereto.

A second shaft 14 suitably journaled for rotation in any well known manner is disposed to be driven by shaft 11, worm 12 and a worm wheel 13 affixed to shaft 14. The worm 12 and worm wheel 13 are of the non-reversible type so that shaft 14 may be driven in one direction only.

A pair of overrunning clutches 15 and 16 are mounted in any suitable manner in concentric relation to shaft 14 and each comprises an inner element 17 rigidly secured to shaft 14 for rotation therewith. The other element 18 of each of the clutches is suitably mounted for relative rotation concentrically of the shaft 14 in either a clockwise or counterclockwise direction and is formed as indicated at 19 with a clutch surface adapted to engage a cooperating clutch surface on a pawl 20 carried by the corresponding inner clutch element 17 when the speed of rotation thereof tends to become greater than the speed or a predetermined fractional part of the speed of rotation of the shaft 14 and corresponding inner clutch element.

In the embodiment shown a shaft 21 which is rotatable in proportion to any desired quantity and whose speed of rotation is to be limited to either the speed, or some predetermined proportional part of the speed of rotation of shaft 14, is suitably mounted in any conventional type of bearings and provided with a gear 22 affixed thereon disposed in driving relation with the outer clutch elements 18. Rotation of shaft 21 will effect rotation of the outer clutch element 18 of clutch 15 and the clutch surface 19 and pawl 20 of this clutch are so arranged as to interlock when shaft 21 is rotated in a counterclockwise direction, as viewed in Fig. 2 from the left end of the shaft, at a speed of rotation such that the outer clutch element of clutch 15 tends to be driven at a greater speed of rotation than shaft 14. The corresponding parts of clutch 16, that is, the clutch element 18 and the pawl 20 of this clutch are designed to remain disengaged or overrun upon counterclockwise rotation of shaft 21. Upon clockwise rotation of shaft 21 one way clutches 15 and 16 will function in a manner just the reverse of that described for counterclockwise rotation of shaft 21.

While in the embodiment herein disclosed the clutches 15 and 16 have been shown as of a specific character it will be understood that any desirable type of overrunning clutch may be employed and that the inner elements of the clutches may be arranged to be driven by shaft 21 and the outer elements by shaft 14, moreover, if desired the inner elements of the clutches may be arranged to be driven in relative reverse directions by shaft 14 through any conventional gear system for the purpose, and the outer elements arranged to be driven in the same relative direction by the shaft 21 through a similar gear system.

The clutches may be selected to be of the type that will lock movement of shaft 21 when shaft 14 is stationary and by substituting a gear train of suitable ratio for the gear 22 the limit of speed of rotation of shaft 21 in either clockwise or counterclockwise direction may be limited to a proportional part of the speed of rotation of shaft 14, or to different limits in clockwise and counterclockwise rotation, or to upper and lower limits in either clockwise or counterclockwise rotation.

In the normal operation of the device the constant speed motor 10 will drive shaft 14 at a constant speed through the non-reversible worm gearing 12 and 13 and shaft 21 will be manually or otherwise suitably rotated which will effect relative reverse rotation of the outer clutch elements 18. If shaft 21 is rotated, say in a counterclockwise direction, at a speed less than the speed of shaft 14 or some predetermined proportional part of the speed of shaft 14 the clutch 15 will merely override, however, if it is attempted to rotate shaft 21 in this counterclockwise direction at a speed greater than the speed or predetermined proportional part of speed of shaft 14 then the inner clutch element 20 will engage the surface 19 on outer clutch element 18 of clutch 15 and limit the speed of shaft 21 by reason of the fact that shaft 21 cannot accelerate or change the speed of shaft 14 due to the non-reversible gearing 12—13. During clockwise movement of shaft 21 at normal speed clutch 16 merely overrides, but upon clockwise movement of shaft 21 beyond normal speed, clutch 16 will function, in the same manner as clutch 15 functions in counterclockwise movement of shaft 21, to limit the clockwise speed of rotation of shaft 21.

The motor 10, in the arrangement disclosed may be one of low power since the clutches are arranged to act on shaft 14 through the non-reversible gearing 12—13 reversely, and where the device is to be installed in, for example an existing fire control director the constant speed motor originally installed in the director will suffice for use with the device.

Having now described a present preferred embodiment of the invention I claim:

1. In a speed limiting device in combination, a shaft, means for non-reversibly rotating the shaft at a constant speed, a pair of overriding clutches, means operably connecting corresponding elements of said clutches to the shaft for movement thereby, a second shaft and means connecting the second shaft to corresponding elements of said clutches cooperating with said first recited elements whereby rotation of said second shaft relative to rotation of said first shaft will be limited to a predetermined speed proportional to the speed of said first shaft.

2. In a speed limiting device in combination, a shaft, means for non-reversibly rotating the shaft at a constant speed, a pair of overriding clutches having cooperating clutch elements, means operably connecting corresponding cooperating elements of said clutches to the shaft for rotation in the same direction thereby, a second shaft, and means connecting the second shaft to corresponding elements of said clutches cooperating with said first recited elements for relative reverse rotation upon rotation of said second shaft whereby relative reverse rotation of said second shaft will be limited to a predetermined speed proportional to the speed of said first shaft.

3. In a speed limiting device in combination, a shaft, means for non-reversibly rotating the shaft at a constant speed, a pair of one way overriding clutches having inner and outer elements, means mounting the inner elements on said shaft, means mounting the outer elements of said clutches for movement relative to said inner elements, said outer elements being engageable with their cooperating inner elements in relative reverse directions of movement, a second shaft, and means connecting the second shaft to said outer elements for relatively reversely rotating said outer elements whereby relative reverse rotation of said second shaft will be limited to a predetermined speed proportional to the speed of said first shaft.

WALTER T. LANG.